(12) United States Patent
Jolissaint et al.

(10) Patent No.: US 6,463,149 B1
(45) Date of Patent: *Oct. 8, 2002

(54) WEB PAGE SYNCHRONIZATION SYSTEM AND METHOD

(75) Inventors: Charles H. Jolissaint, Sunnyvale; Xuan McRae, Fremont, both of CA (US)

(73) Assignee: Edify Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/529,166

(22) Filed: Sep. 15, 1995

Related U.S. Application Data

(63) Continuation-in-part of application No. 08/419,103, filed on Apr. 10, 1995.

(51) Int. Cl.[7] .......................... H04M 1/64; H04M 11/00; H04M 3/00
(52) U.S. Cl. .............................. 379/265.09; 379/88.17; 379/93.09; 379/265.01; 379/210.01; 379/266.07
(58) Field of Search ................................. 370/352, 353, 370/380, 389, 392, 396, 401, 404, 427, 435, 450, 465, 485; 379/90.01, 93.01, 93.05, 93.09, 100.15, 100.16, 265.01–265.09, 88.17, 258, 265; 709/204–227

(56) References Cited

U.S. PATENT DOCUMENTS

| | | | |
|---|---|---|---|
| 4,805,209 A | 2/1989 | Baker, Jr. et al. ............. 379/96 |
| 4,942,602 A | 7/1990 | Baker, Jr. et al. ........... 379/212 |
| 4,943,996 A | 7/1990 | Baker, Jr, et al. ............. 379/96 |
| 4,949,373 A | 8/1990 | Baker, Jr. et al. ............. 379/96 |
| 4,955,047 A | 9/1990 | Morganstein et al. ........ 379/112 |
| 4,975,941 A | 12/1990 | Morganstein et al. ......... 379/88 |
| 5,020,095 A | 5/1991 | Morganstein et al. ......... 379/67 |
| 5,029,196 A | 7/1991 | Morganstein ................. 379/67 |
| 5,097,528 A | 3/1992 | Gursahaney et al. .......... 379/67 |
| 5,109,405 A | 4/1992 | Morganstein ................. 379/89 |
| 5,164,981 A | 11/1992 | Mitchell et al. ............... 379/88 |
| 5,303,298 A | 4/1994 | Morganstein et al. ......... 379/67 |
| 5,309,504 A | 5/1994 | Morganstein ................. 379/67 |
| 5,327,486 A * | 7/1994 | Wolff et al. .................... 379/96 |

(List continued on next page.)

FOREIGN PATENT DOCUMENTS

| | | | |
|---|---|---|---|
| EP | 0375119 A2 | 6/1990 | ............ H04Q/3/00 |
| EP | 0 425 161 A3 | 5/1991 | ............ H04M/3/50 |
| EP | 0545226 A2 | 6/1993 | ............ H04M/3/50 |
| GB | 2273853 A | 6/1994 | ............ H04M/3/42 |
| WO | WO 88/0296 | 4/1988 | ............ H04M/3/50 |
| WO | WO 95/06380 | 3/1995 | ............ H04M/3/00 |

OTHER PUBLICATIONS

Hassler, Kerry W., et al., "Revolutionizing DEFINITY Call Centers in the 1990s", AT&T Technical Journal, vol. 74, No. 4, Jul./Aug. 1995, pp. 64–73.

*Primary Examiner*—Allan Hoosain
(74) *Attorney, Agent, or Firm*—Fenwick & West LLP

(57) ABSTRACT

A system and method are provided for routing data base information obtained in an automated Internet message response to a subsequently selected live agent. An electronic workforce identifies the customer, pulls customer identification, pulls a record on the customer, provides information requested by customer, and permits the customer to select a live agent, provides the live agent number to determine the network identification number. Accordingly, the live agent receives data base information on a customer at the time the live agent begins conversation with the customer.

10 Claims, 17 Drawing Sheets

U.S. PATENT DOCUMENTS

| | | | | |
|---|---|---|---|---|
| 5,345,501 A | * | 9/1994 | Shelton | 379/88 |
| 5,347,574 A | | 9/1994 | Morganstein | 379/210 |
| 5,436,966 A | * | 7/1995 | Barrett et al. | 379/265 |
| 5,459,780 A | * | 10/1995 | Sand | 379/309 |
| 5,530,852 A | * | 6/1996 | Meske, Jr. et al. | 395/600 |
| 5,533,115 A | * | 7/1996 | Hollenback et al. | 379/220 |
| 5,555,299 A | * | 9/1996 | Maloney et al. | 379/212 |
| 5,572,643 A | * | 11/1996 | Judson | 395/793 |
| 5,604,737 A | * | 2/1997 | Iwami et al. | 370/352 |
| 5,608,786 A | * | 3/1997 | Gordon | 379/100 |
| 5,619,557 A | * | 4/1997 | Van Berkum | 379/88 |
| 5,621,789 A | * | 4/1997 | McCalmont et al. | 379/265 |
| 5,742,670 A | * | 4/1998 | Bennett | 379/142 |
| 5,884,032 A | * | 3/1999 | Bateman et al. | 709/204 |
| 5,991,394 A | * | 11/1999 | Dezonno et al. | 379/265 |

* cited by examiner

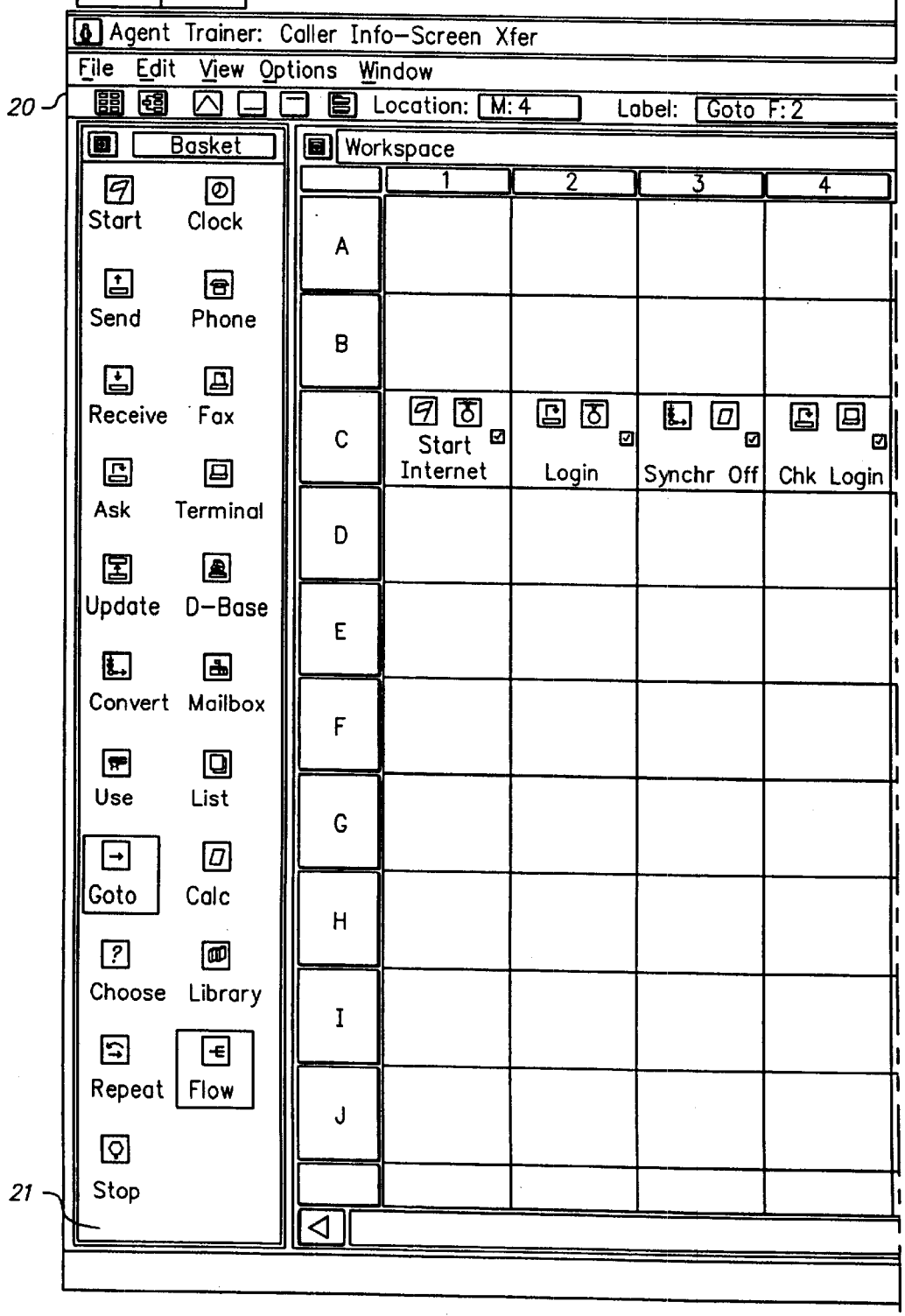

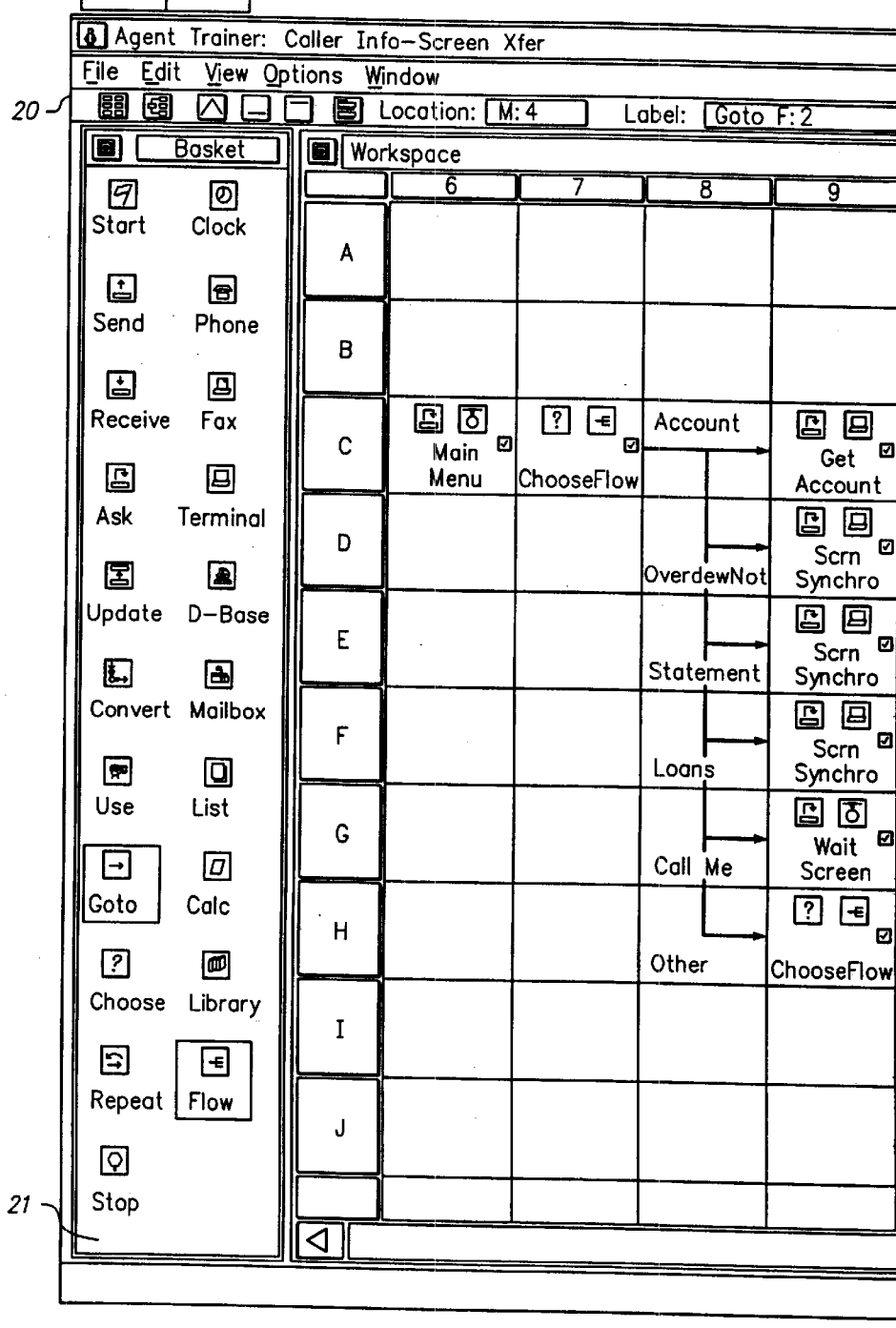

WEB PAGE SYNCHRONIZATION SYSTEM AND METHOD

TECHNICAL FIELD OF THE INVENTION

This application is a continuation-in-part application of U.S. patent application Ser. No. 08/419,103, filed Apr. 10, 1995 and having the title "Object Oriented Customer Information Exchange System and Method" which is hereby expressly referenced and incorporated herein by reference.

This application is further related to U.S. Pat. No. 5,740,240 filed on even day herewith and having the title "Computer Telephony Integration System and Method" which is hereby expressly referenced and incorporated herein by reference.

TECHNICAL FIELD OF THE INVENTION

This invention relates to systems and methods for computer telephony and web page synchronization.

BACKGROUND

Current Internet systems interact problematically with private branch exchange (PBX) switches connected to voice response units and electronic workforces, operating with computer data bases. The on-line customer may wish to modify data stored in a computer data base but needs subsequently to communicate directly with a live agent accessible through an automatic call distribution (ACD) queue.

The customer information which has been produced from database storage based upon the customer identification must typically either be reproduced again from the original data base or must be transmitted to the live agent to enable the provide immediate assistance without having to repeat the entire user identification and data query operation which produced user specific information to service the particular call.

Unfortunately, currently available methods and systems for routing user information based upon an initial automated user identification to a subsequently determined live agent are slow, cumbersome, and require repetitive presentation of the same customer information first to the voice response unit and electronic workforce, and then directly to the live agent, followed by waiting periods during which the live agent accesses a computer data base indicating customer data by customer ID#.

SUMMARY OF THE INVENTION

According to the present invention, a customer inquires by Internet and through an automated voice response unit (VRU) or electronic workforce as to information in a computer database on a computer which is network connected to the automated VRU or electronic workforce. The electronic workforce system or VRU makes a customer identification request over the Internet. The customer then provides its ID# or other identification code to permit extraction of customer specific information from the database. The electronic workforce system according to the present invention uses the identifying information to query a computer database for information about the inquiring customer. The information provided in the database may include information about customer characteristics or preferences. This or other information is then provided by the electronic workforce system to the customer via the Internet. In view of the information received, the customer may wish to speak with a live agent. If the customer elects a live agent, a particular live agent is selected through an automatic call distribution (ACD) queue process.

According to the present invention, Internet messages on a web server are processed along with switch and computer based information using a voice response unit (electronic workforce) such as an electronic workforce, a switch such as a private branch exchange (PBX), a computer having a data base, and a live agent having direct access to a personal computer and a telephone.

According to the present invention, a software agent in the electronic workforce performs intelligent call routing with information about a customer provided to a live agent identified after the call has been received by the electronic workforce and after the customer has made a request for a live agent.

According to the present invention, a software agent transfers a call to a live agent and accesses a customer's record so the live agent can answer the call in a more personal and efficient manner. Thus, a coordinated call and screen transfer operation, i.e., screen popping evolution, is accomplished with the customer identify being established once by the electronic workforce without need for reascertainment by the live agent, because the information about customer identity is passed by network to the correct one of a number of live agents working a switch site.

According to the present invention, telephone calls are intelligently routed and transferred by a call center agent performing account handling activities, based upon ANI/DNIS information. The software agent receiving the call obtains calling party information, permitting access to a local table, local or remote database information, or a host computer about the customer or number dialed to route the call to a specific live agent, live agent group, or particular electronic work force (EWF) job description.

DETAILED DESCRIPTION OF THE INVENTION

Figure 1A:
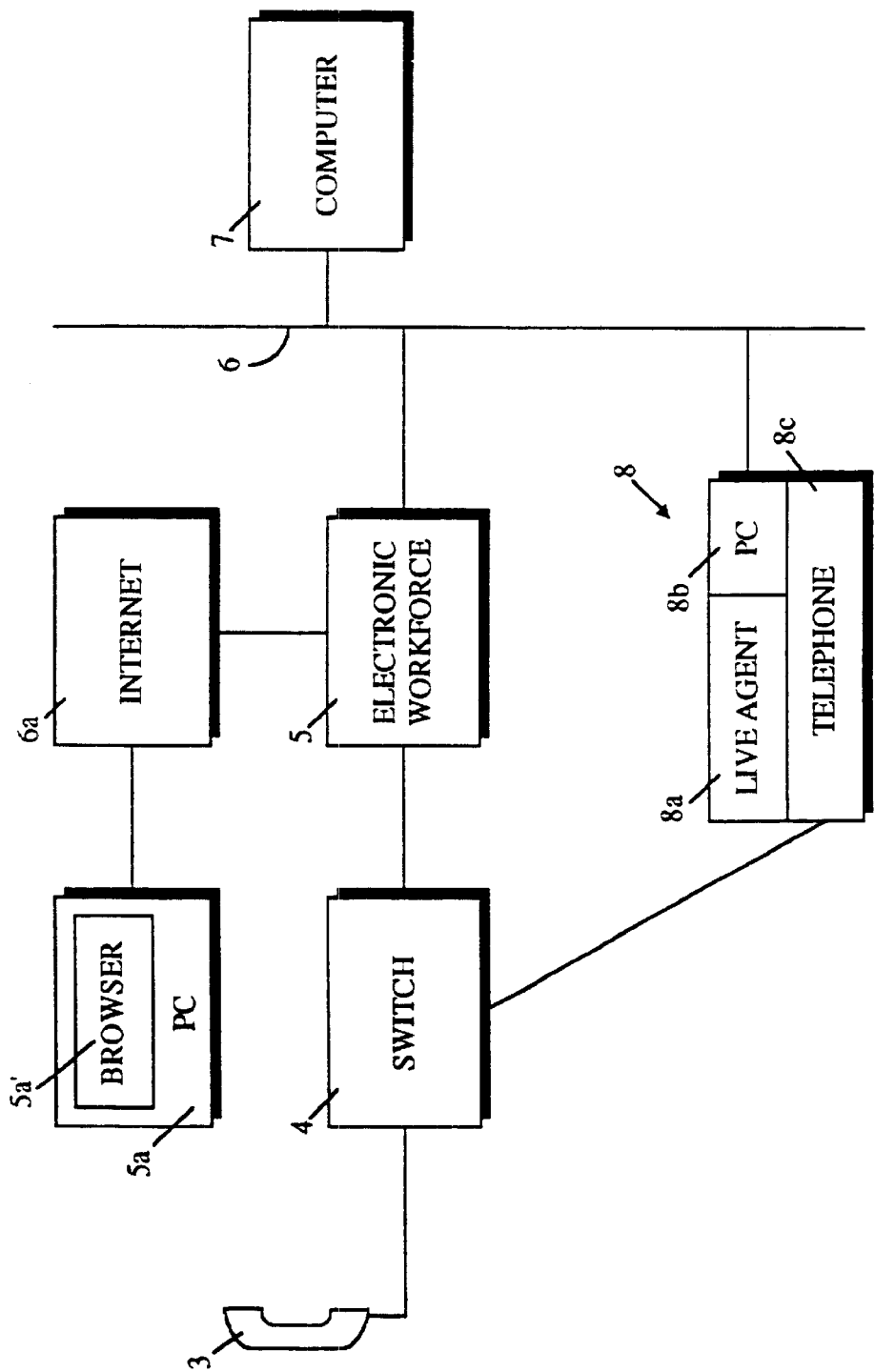
FIG. 1a is a block diagram of a combined Internet and computer telephone system according to the present invention.

FIG. 1a is a block diagram of an Internet computer telephony system according to the present invention. The system of the present invention includes a first telephone 3 used by a customer interested in speaking with a live agent about information in a data base, after initial on-line communication with the data base has proven unsatisfactory. The system further includes a switch 4 such as a private branch exchange (i.e., a PBX), a voice response unit (VRU) such as an electronic workforce 5 made by Edify Corporation of Santa Clara, Calif.

The Internet computer telephony system according to the present invention shown in FIG. 1a additionally includes a bus 6 interconnected attached elements in a network, a computer 7 having a database, which may be a mainframe, a minicomputer, or a personal computer (PC). The system further includes a live agent system 8 including a live agent 8a, a personal computer (PC) 8b, and a second telephone 8c used by live agent 8a to communicate with switch 4. First telephone 3 is a conventional telephone employed by a user to initiate a user call. First telephone is connected to the central telephone network at a telephone switch 4. Telephone switch 4 is in turn connected to electronic workforce 5, and second telephone 8c. Further, electronic workforce 5, and second telephone 8c are each connected to bus 6 which in turn is connected to computer 7. Electronic workforce 5 is programmed according to the present invention to make an automated response to telephone calls received from switch 4, as discussed in detail below in connection with FIGS. 3a–3d. Particular details about electronic workforce 5 are provided in U.S. patent application Ser. No. 07/708,463, filed May 5, 1991 and having the title "Object Oriented Customer Information Exchange System and Method" which is hereby expressly referenced and incorporated herein by reference.

The customer initially communicates with electronic workforce 5 through the Internet 6a via a personal computer 5a which has a browser 5a', and is able to communicate on line with a web page on electronic workforce 5.

Network bus 6 in FIG. 1a is a parallel set of electric wires carrying byte wide data signals and control or information signals between network elements including call path server 5a, electronic workforce 5, personal computer 8b, and computer 7. The network bus can be a Telnet connection, for example. Computer 7 is a general purpose computer having memory for storing a data base as well as other well known computer features. Live agent 8a is a human person acting as a telephone operator or service individual. Switch 4 is connected to second telephone 8c through an automatic call distribution (ACD) queue. Personal computer 8a is a general purpose computer having a x86 architecture, for example. Personal computer 8a is connected through network bus 6 to computer 7 to receive customer information on a desk-top pop-up screen offering a visual depiction of selected data stored in computer 7. Second telephone 8c is a consumer telephone device, for example, connected to switch 4 through an ACD queue.

Figure 1B:
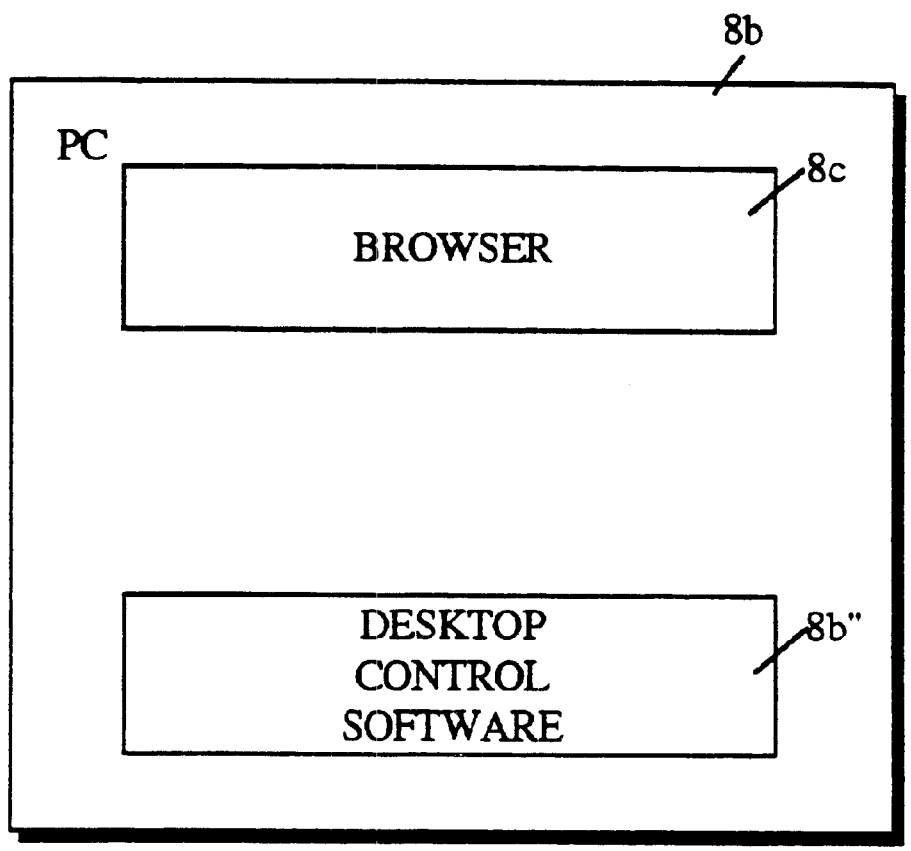
FIG. 1b is a block diagram of a live agent personal computer (PC) including mainframe access software and associated desktop control and browser software.

FIG. 1b is a block diagram of a live agent personal computer (PC) 8b including desktop control software 8b" which is loaded onto internal PC memory for operation. Further installed on PC 8b is a browser 8c which enables effective Internet communication, as will be discussed in greater detail immediately below.

Figure 1C:
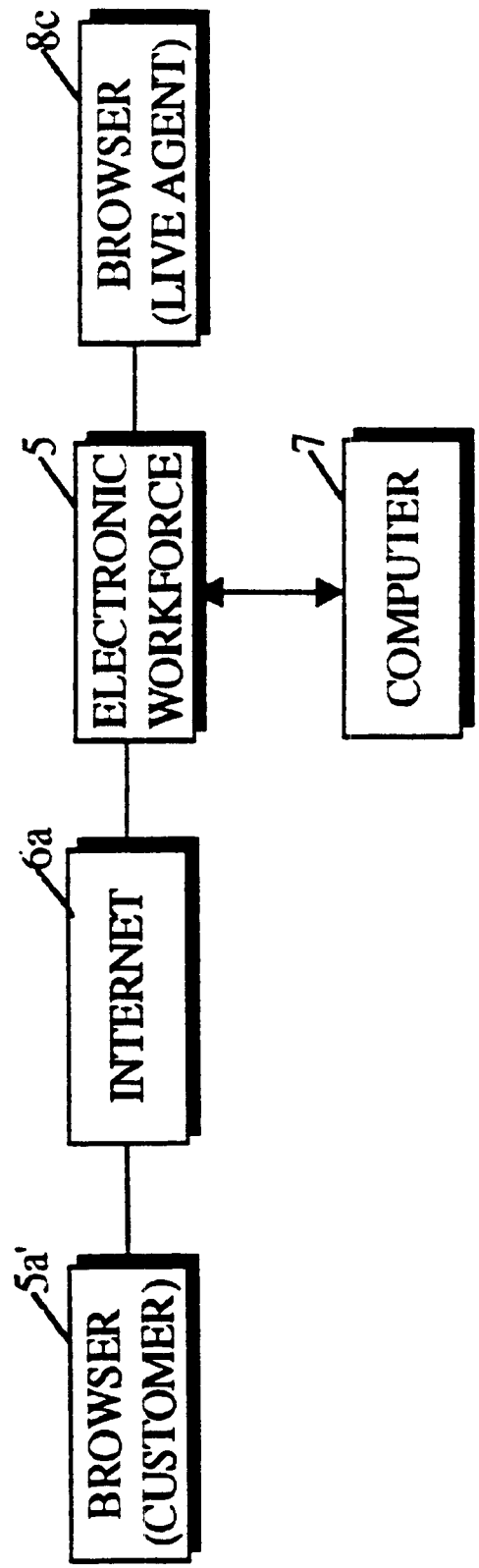
FIG. 1c is a block diagram of selected portions of the combined Internet and computer telephone system according to the present invention, specifically showing a browser installed on a customer's personal computer, the Internet, an electronic workforce, a computer, and a browser installed on the personal computer of a live agent.

FIG. 1c is a block diagram of selected portions of the combined Internet and computer telephone system according to the present invention, specifically showing browser 5a' installed on a customer's personal computer, the Internet 6a, electronic workforce 5, computer 7, and a browser 8c installed on the personal computer of a live agent. This Figure is useful in comprehending Internet communications between a customer and a live agent, while parallel telephone communication is occurring. As changes in the database on computer 7 are taking place, these changes are being reflected on the web page being maintained on electronic workforce 5. Customer browser 5a' is updated by the customer making an information request to the web page on electronic workplace 5. Live agent browser 8c is separately updated by reference to electronic workplace 5, as will be discussed in detail below.

Figure 1D:
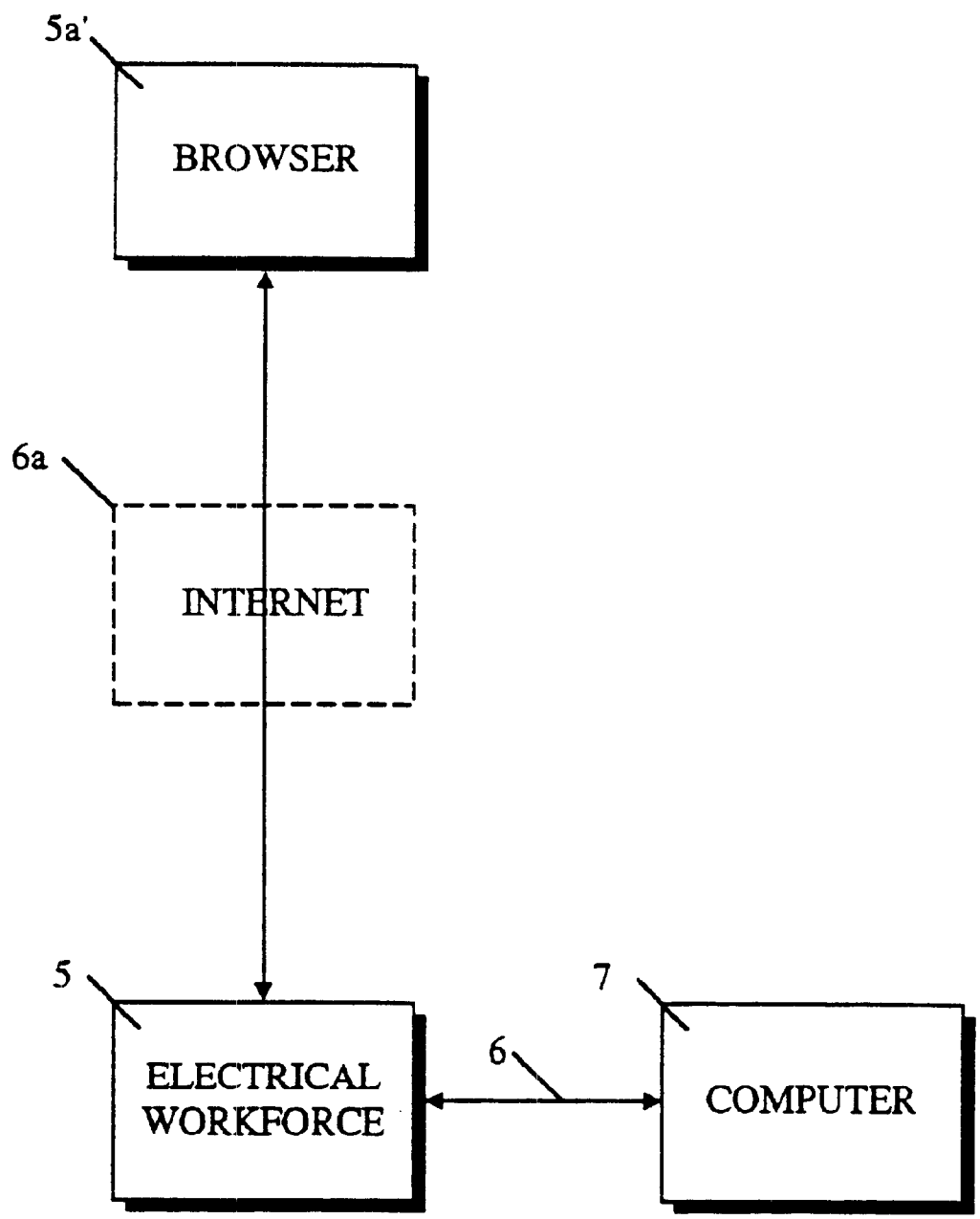
FIG. 1d is a block diagram of selected portions of the combined Internet and computer telephone system according to the present invention, specifically showing a browser installed on a customer's personal computer, the Internet, an electronic workforce, a network bus, and a computer.

FIG. 1d is a block diagram of selected portions of the combined Internet and computer telephone system according to the present invention, specifically showing browser 5a' installed on a customer's personal computer, the Internet 6a, electronic workforce 5, network bus 6, and computer 7. This Figure. is useful in comprehending bilateral browser communications with electronic workforce 5, and bilateral communications between workforce 5 and computer 7. As changes in the database on computer 7 take place, these changes are reflected on the web page being maintained on electronic workforce 5. Customer browser 5a' is updated by the customer making an information request to the web page on electronic workplace 5. Browser 5a' asks for updates directly from electronic workforce 5, and browser 5a' receives the updates directly from electronic workforce 5 through the medium of the Internet 6a.

Figure 1E:
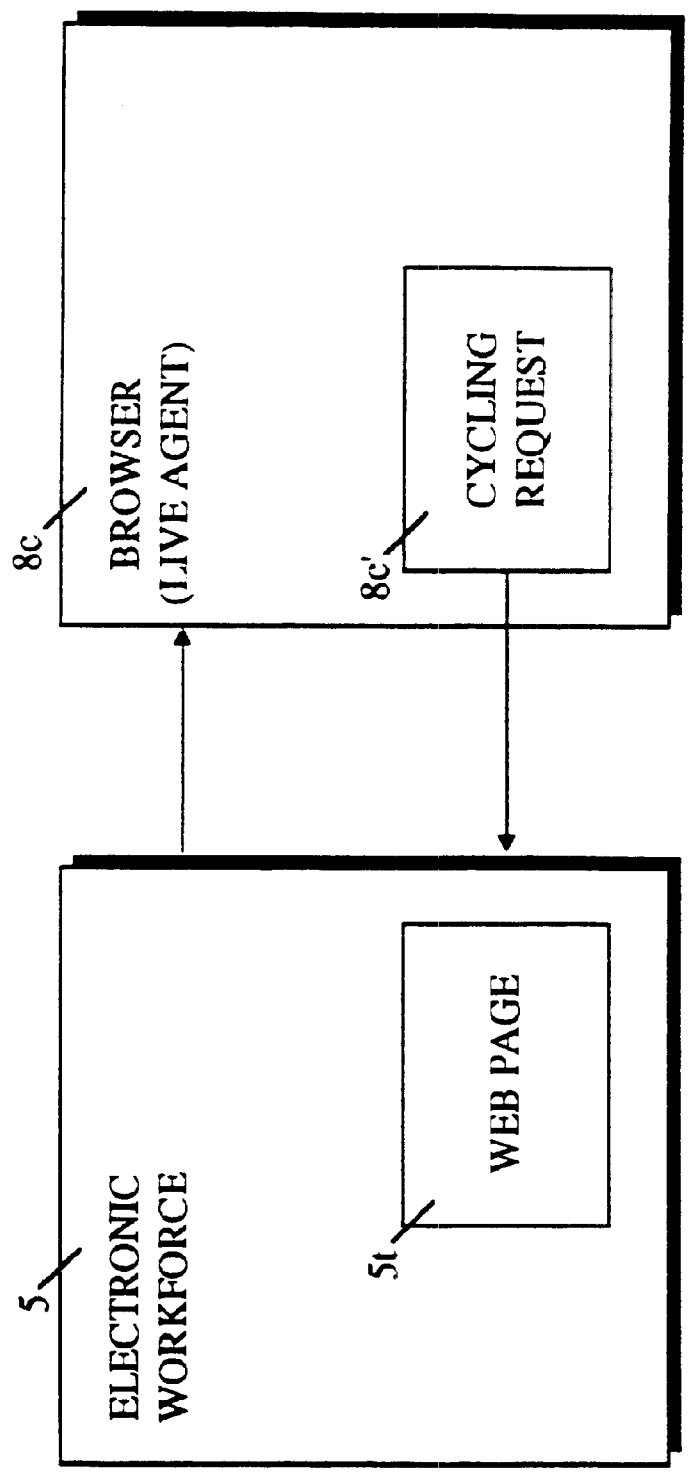
FIG. 1e is a block diagram of selected portions of the combined Internet and computer telephone system according to the present invention, specifically showing electronic workforce and browser which is installed on the personal computer of a live agent.

FIG. 1e is a block diagram of selected portions of the combined Internet and computer telephone system according to the present invention, specifically showing electronic workforce 5 and browser 8c which is installed on the personal computer of a live agent. Electronic workforce 5 includes web page 5t. Live agent browser 8c includes cycling request block 8c ', according to one embodiment of the present invention. This Figure is useful in comprehending how live agent browser 8c is updated, according to one embodiment of the present invention. As changes in the database on computer 7 are taking place, these changes are being reflected on web page 5t maintained on electronic workforce 5. Live agent browser 8c is updated by reference to electronic workplace 5 by a request automatically made, either cyclically, regularly, or on a timed basis.

The request is considered to be made by a particular software module referred to as the cycling request module 8c'. As a result of the cyclic request made (whether regular or irregular), electronic workforce 5 provides updated information from web page 5t or from a selected memory or storage location.

Figure 1F:
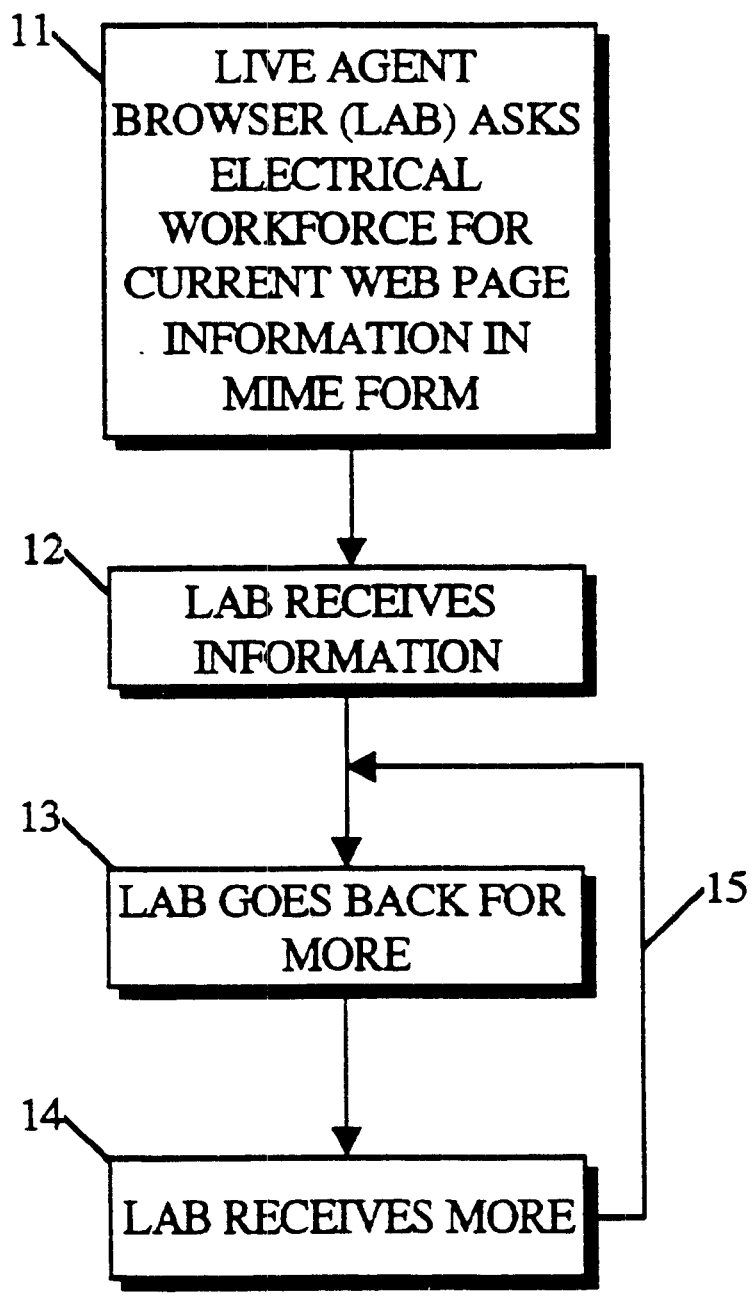
FIG. 1f provides an updating process for an agent browser (LAB), according to the present invention.

Such updating is described in greater detail in FIG. 1f. In particular, live agent browser (LAB) asks 11 the electronic workforce to current web page information in mime type form. Next the live agent browser (LAB) asks the electronic workforce for current web page information in mime form. Next, the LAB receives 12 the information. Then, the LAB goes back 13 for more information. Thereafter, the LAB receives 14 more information. Finally, operation continues at the beginning of block 13 with the LAB going back for more information. Once a request by LAB 8c is made in mime form, after every receipt of information, it automatically goes back for more information.

Figure 1G:
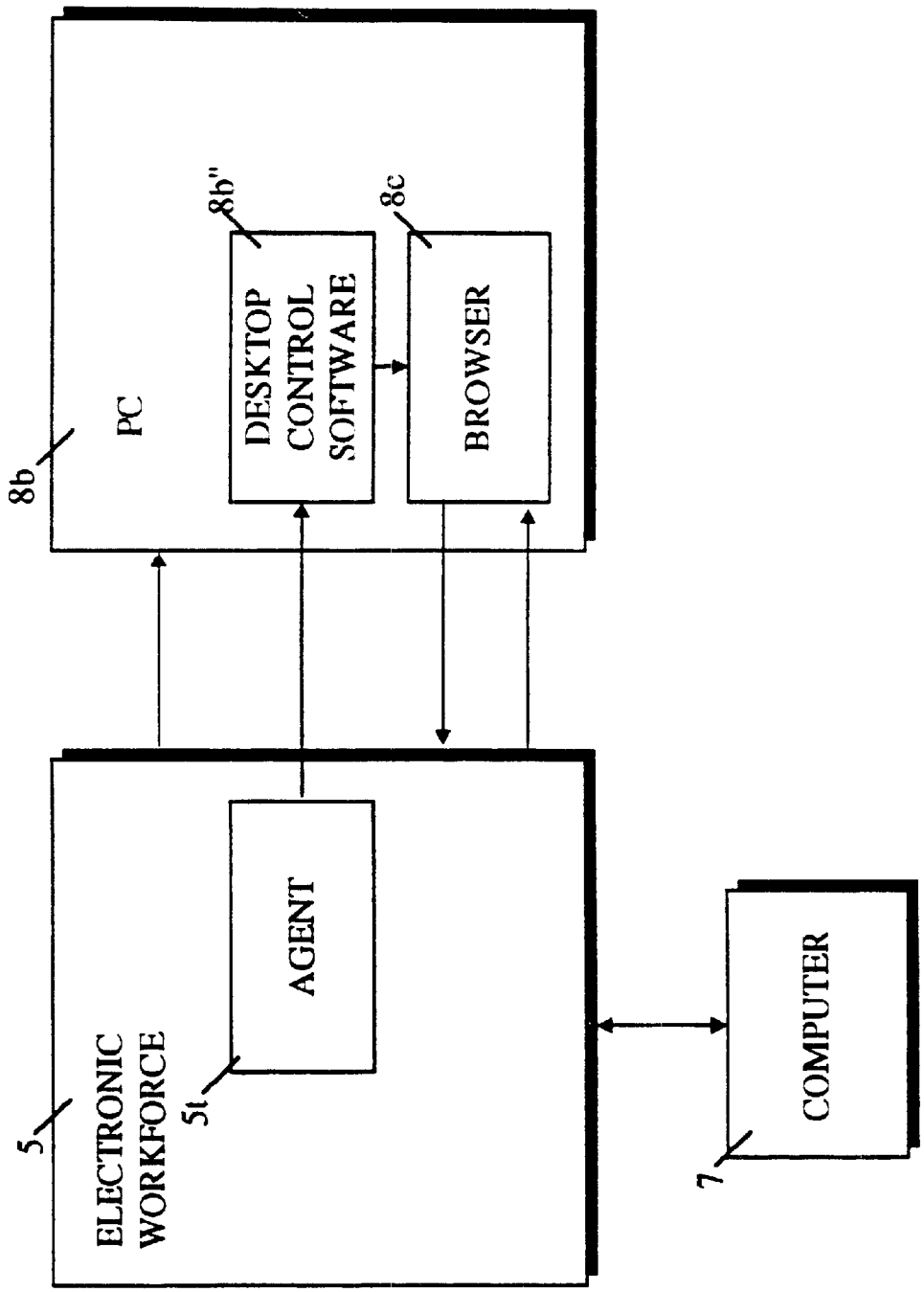
FIG. 1g is a block diagram of selected portions of the combined Internet and computer telephone system according to the present invention, specifically showing electronic workforce 5, personal computer 8b, desktop control software 8b", and browser 8c which is installed on the personal computer of a live agent, according to one embodiment of the present invention.

FIG. 1g is a block diagram of selected portions of the combined Internet and computer telephone system according to the present invention, specifically showing electronic workforce 5, personal computer 8b, desktop control software 8b", and browser 8c which is installed on the personal computer of a live agent, according to one embodiment of the present invention. Electronic workforce 5 includes agent 5t' according to this embodiment. This Figure is useful in comprehending how live agent browser 8c is updated, according to one embodiment of the present invention. As changes in the database on computer 7 are taking place, these changes are being reflected on web page 5t maintained on electronic workforce 5. Live agent browser 8c is updated by reference to electronic workplace 5 by a request made, upon direction from agent 5t. As a result of the directions provided by agent 5t (whether regular or irregular), browser 8c makes a request for an update to electronic workforce 5 and it receives the update from electronic workforce pursuant to its request for the update. Electronic workforce 5 provides the updated information from web page 5t or from a selected memory or storage location. More particularly, agent 5t provides the directions to desktop control software 8b", which in turn provides direction to browser 8c to make a request of electronic workforce 5.

Figure 1H:
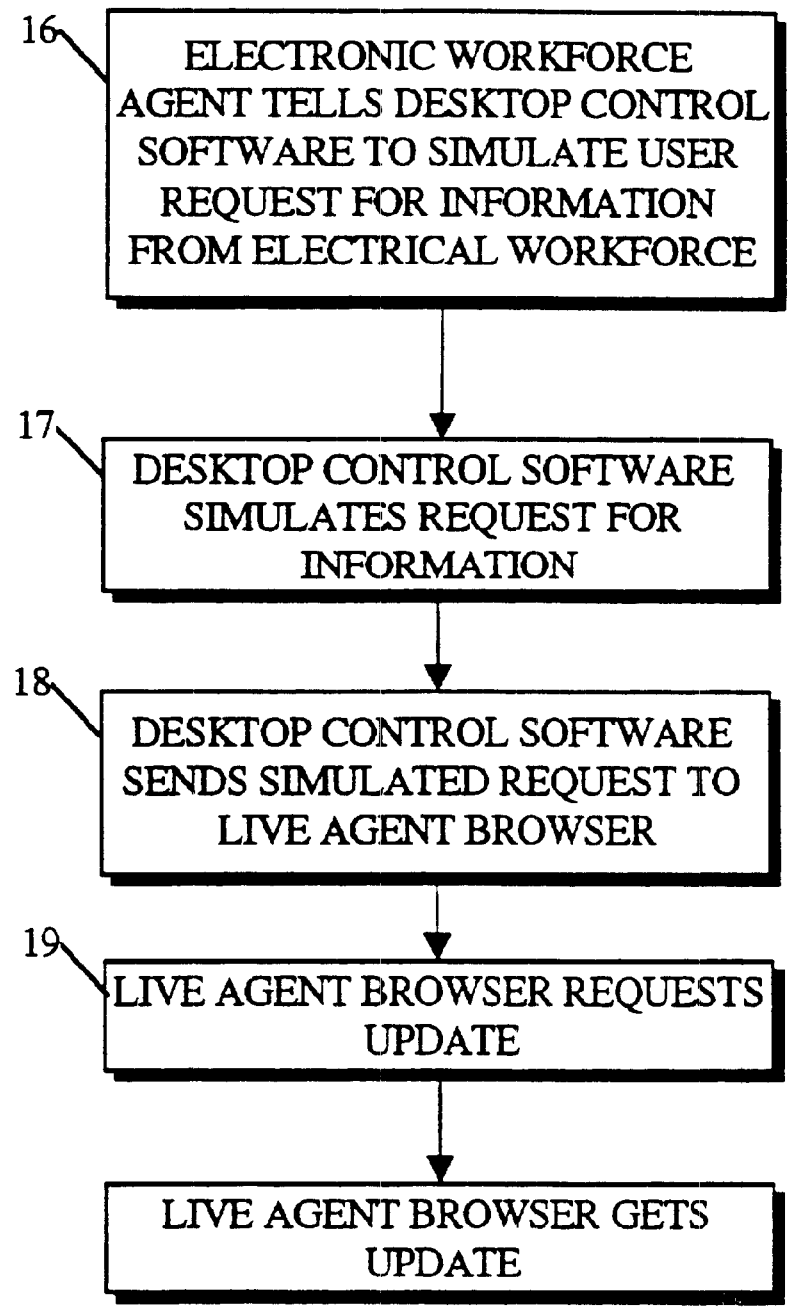
FIG. 1h shows an updating method according to the present invention, wherein desktop control software 8b" is used to simulate a user request for information from electronic workforce 5.

Such updating is described in greater detail in FIG. 1h. In particular, electronic workforce agent 5t tells 16 desktop control software 8b" to simulate a user request for information from electronic workforce 5. Then, desktop control software 8b" simulates 17 the request for information. Next, desktop control software 18 sends a simulated request to the live agent browser. Next, the live agent browser requests 19 an update. Finally, the live agent browser gets 20 an update.

Figures 2, 2A:
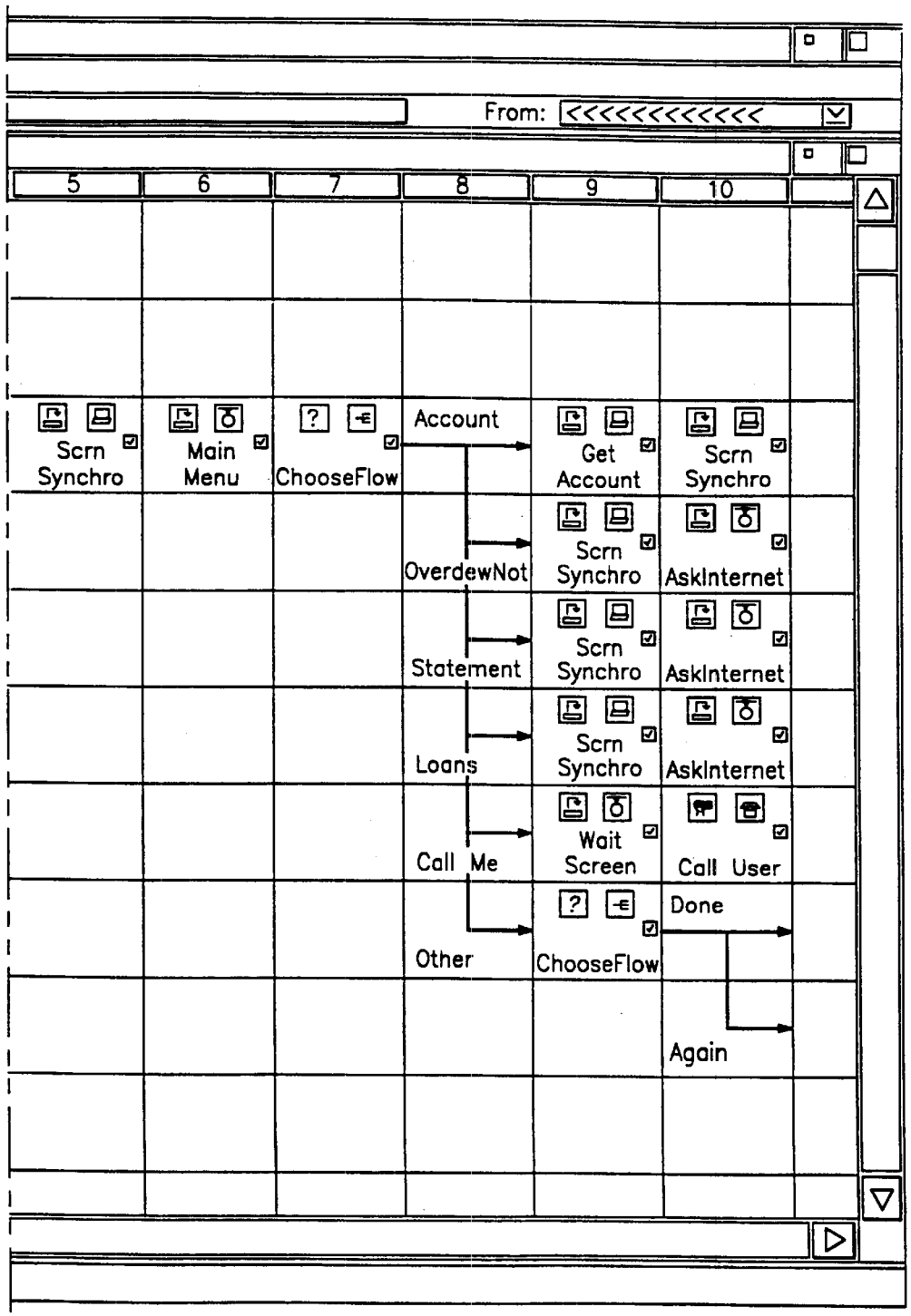
FIGS. 2a–2b are a composite display window for an electronic workforce indicating a screen programming process according to which an automated call processing sequence is defined to respond automatically to a customer Internet inquiry and to identify a live agent, according to the present invention.
Figures 2, 2B:
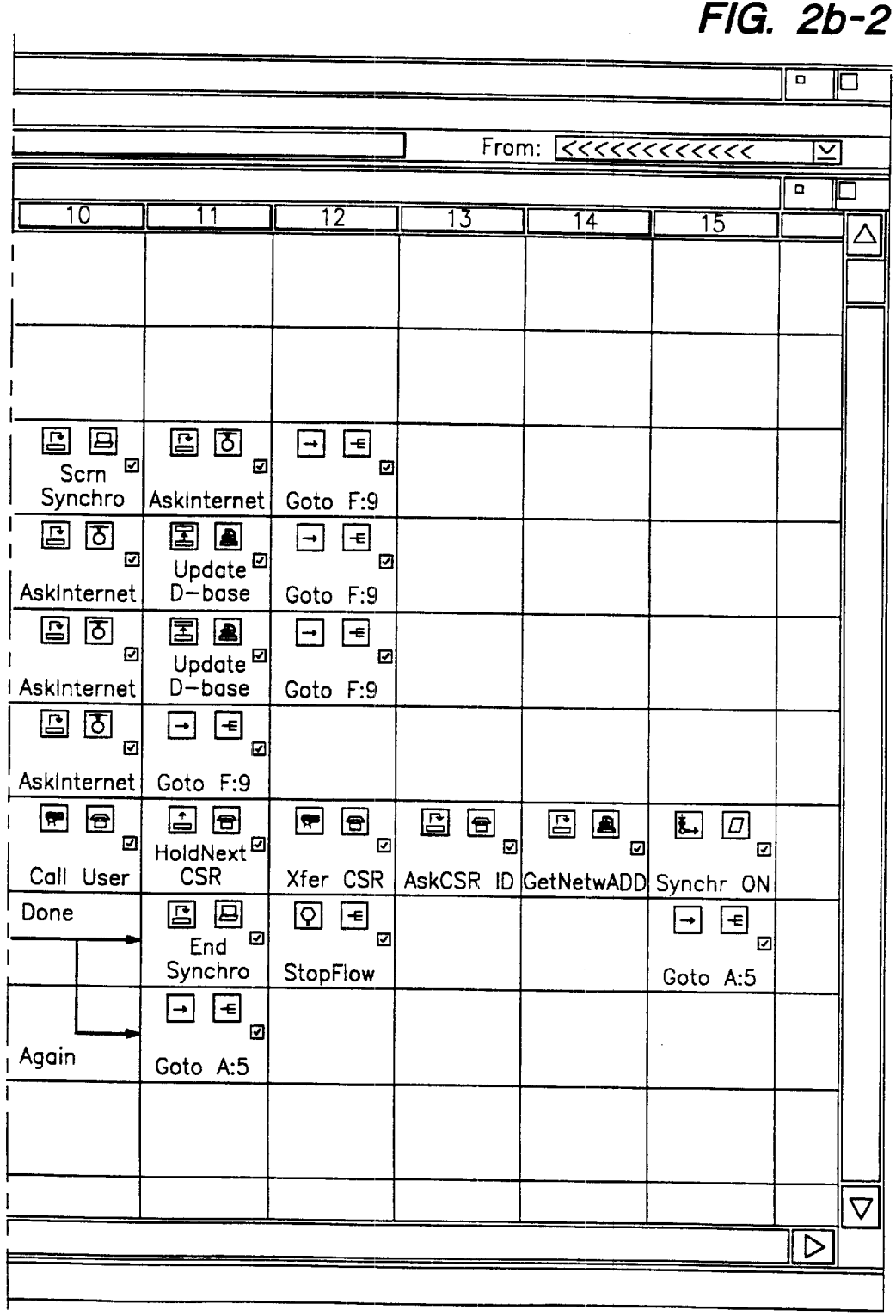

FIGS. 2a–2b are a composite display window 20 for electronic workforce 5 indicating a screen programming process according to which an automated call processing sequence is defined to respond automatically to a user telephone call. Display window 20 includes a menu 21 of action and device icons in respective first and second columns. As described in the above-referenced, incorporated patent application showing the electronic workforce 5, by selecting an action and device icon for placement at a grid position in display window 20, an object is established in a predetermined time sequence to cooperate with other linearly positioned objects, to perform automated call processing sequences. According to an embodiment of the present invention, Internet operation begins at grid position Cl, followed by Internet login at C2. Synchronism is turned off at C3. Terminal login is checked at C4. Screen synchronism is accomplished at C5. Such synchronism means that the web page is updated. The Internet main menu is requested at C6. A choice of flow alternatives is indicated at C7. Six flow choices are indicated respectively at C8, D8, E8, F8, G8, and H8. The first flow choice beginning at C8 is an account flow. The first flow choice beginning at C8 is an account flow. The second flow choice beginning at D8 is an overdraft flow. The third flow choice beginning at E8 is a statement flow. The fourth flow choice beginning at F8 is a loan flow. The fifth flow choice beginning at G8 is a "call me" flow. The sixth flow choice beginning at H8 is an "other" flow. The account flow includes getting an account, as indicated at C9. The overdraft flow includes accomplishing screen synchronization, as indicated at D9. The statement flow includes accomplishing screen synchronization, as indicated at E9. The loan flow includes accomplishing screen synchronization, as indicated at F9. The "call me" flow includes waiting for an Internet screen, as indicated at G9. The "other" flow includes choosing another flow, as indicated at H9.

The account flow next includes accomplishing screen synchronization, as indicated at C10. The overdraft flow includes asking Internet, as indicated at D10. The statement flow includes asking Internet, as indicated at E10. The loan flow includes asking Internet, as indicated at F10. The "call me" flow includes calling the user or customer, as indicated at G10. The "other" flow includes operations being done or branching to further operations, as indicated respectively at H10 and I11.

Further operations are shown in FIG. 2b. The account flow next includes asking Internet, as indicated at C11. The overdraft flow includes updating the database, as indicated at D11. The statement flow includes updating the database, as indicated at E11. The loan flow includes going to H9, as indicated at F11. The "call me" flow includes holding for the next customer service representative (CSR), as indicated at G11. The "other" flow includes ending synchronization or going to C5, as indicated respectively at H11 and I11.

The account flow next going to H9, as indicated at C12. The overdraft flow includes going to H9, as indicated at D12. The statement flow includes going to H9, as indicated at E12. The "call me" flow includes transferring to a customer service representative (CSR), as indicated at G12. The "other" flow includes stopping flow, as indicated at H12.

The "call me" flow includes asking for the customer service representative's identification (ID), as indicated at G13, then getting the network address for the particular customer service representative's personal computer as indicated at G14, turning synchronism on as indicated at G15, and going to C5 as indicated at H15 which would normally be next in linear flow at G16 but is for convenience depicted at H15.

Figure 3A:
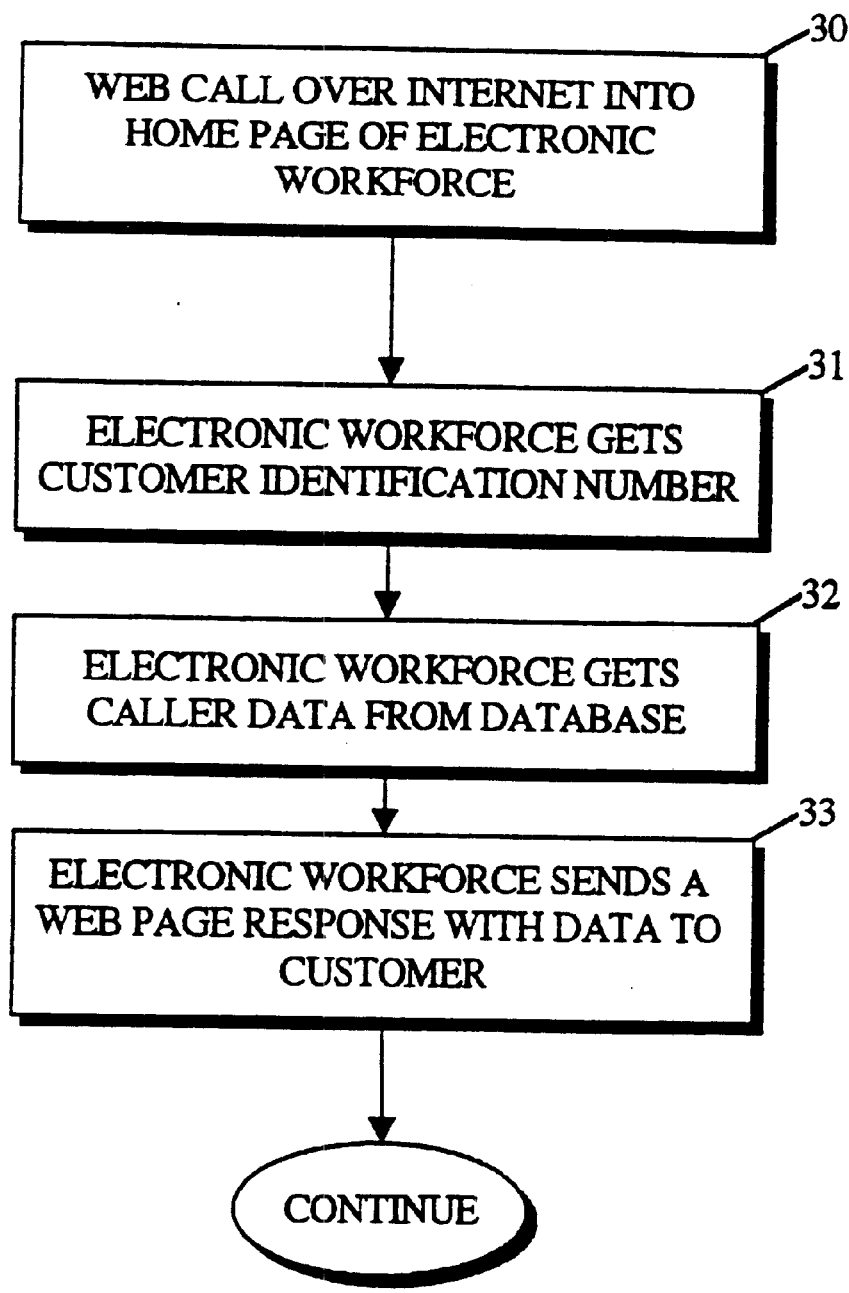
FIGS. 3a–3e shows a method of call processing according to the present invention.

FIG. 3a shows operation of the Internet computer telephony system according to one embodiment of the present invention. In particular, when a customer makes a web call 30 over the Internet to electronic workforce 5, the electronic workforce answers the call electronically. Electronic workforce 5 electronically asks for the customer to provide identification information such an identification (ID) number and a telephone number. When the customer provides the ID# or the like, electronic workforce 5 gets 31 the customer ID#. Next, electronic workforce 5 uses the ID# to access database information on computer 7 about the customer, and gets 32 particular customer data which is of interest or utility with respect to the customer, from the database in computer 7. The particular customer data may for example indicate something about the relationship between the holder or operator of electronic workforce 5 and the customer, such as account or financial information, for example. As a consequence of having received the information, electronic workforce 5 accordingly sends 33 a web page response to the customer and provides selected information which has been acquired from computer 7. Electronic workforce 5 may play a menu of options or alternatives to the customer, after the information has been provided, including a choice as to whether the customer wishes to speak with a live person, i.e., live agent. This is possible, when the customer is surprised, for example, about the information received. For example, the customer may find there is a zero balance in an account.

Figure 3B:
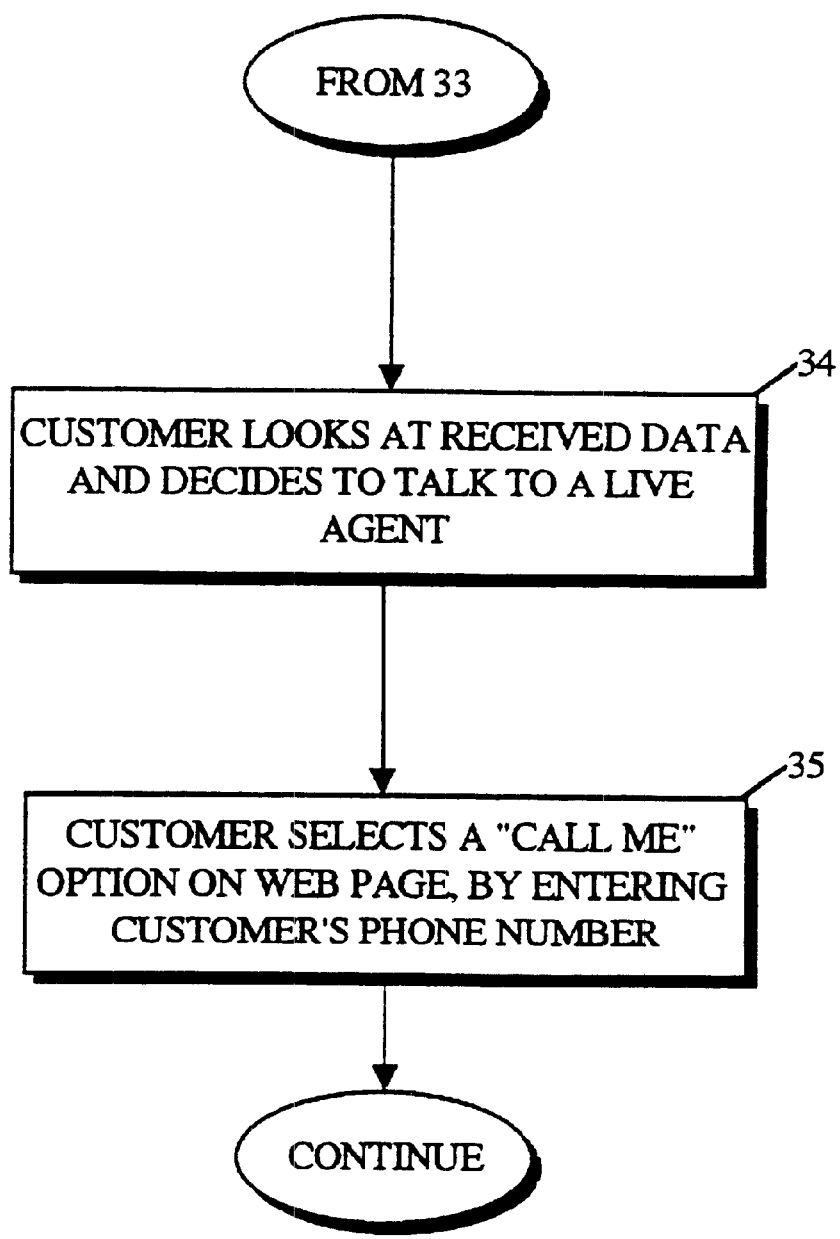
Figure 3C:
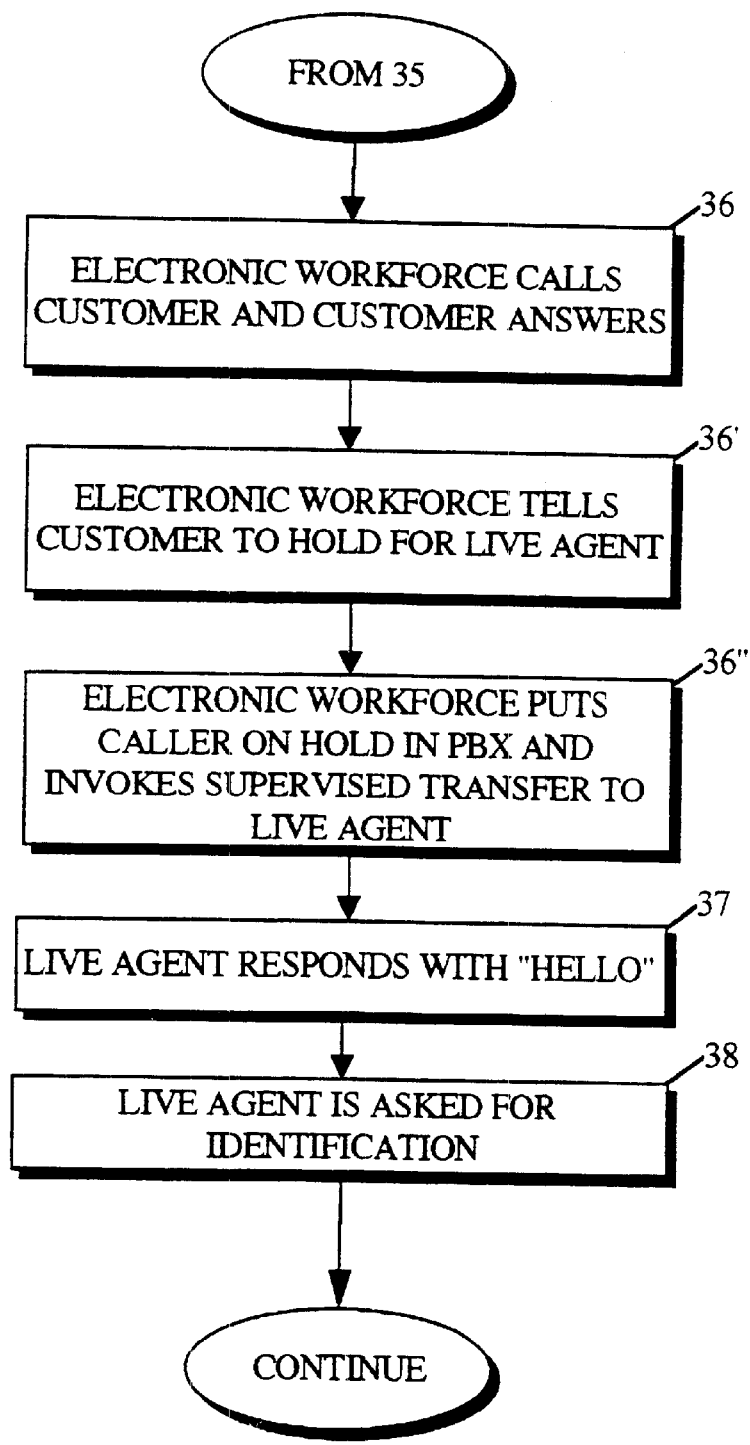

The method according to the present invention continues at FIG. 3b, with the customer looking at the received data and asking 34 for a live agent. Then, the customer selects a "call me" option 35 on a web page, by entering the customer's phone number.

Further, a supervised PBX transfer is invoked and the electronic workforce 5 calls a customer 36 and the customer answers. Next, electronic workforce 5 tells the customer to hold for a live agent.

Then, electronic workforce 5 puts the customer on hold in the PBX and invokes supervised transfer to a live agent. After that, the live agent responds with a "hello" 37 and is asked 38 for identification by electronic workforce 5 operating through switch 4, which is provided either directly by the voice of the live agent, or by a DTMF signal either automatically provided or given by the human intervention of the particular live agent.

Figure 3D:
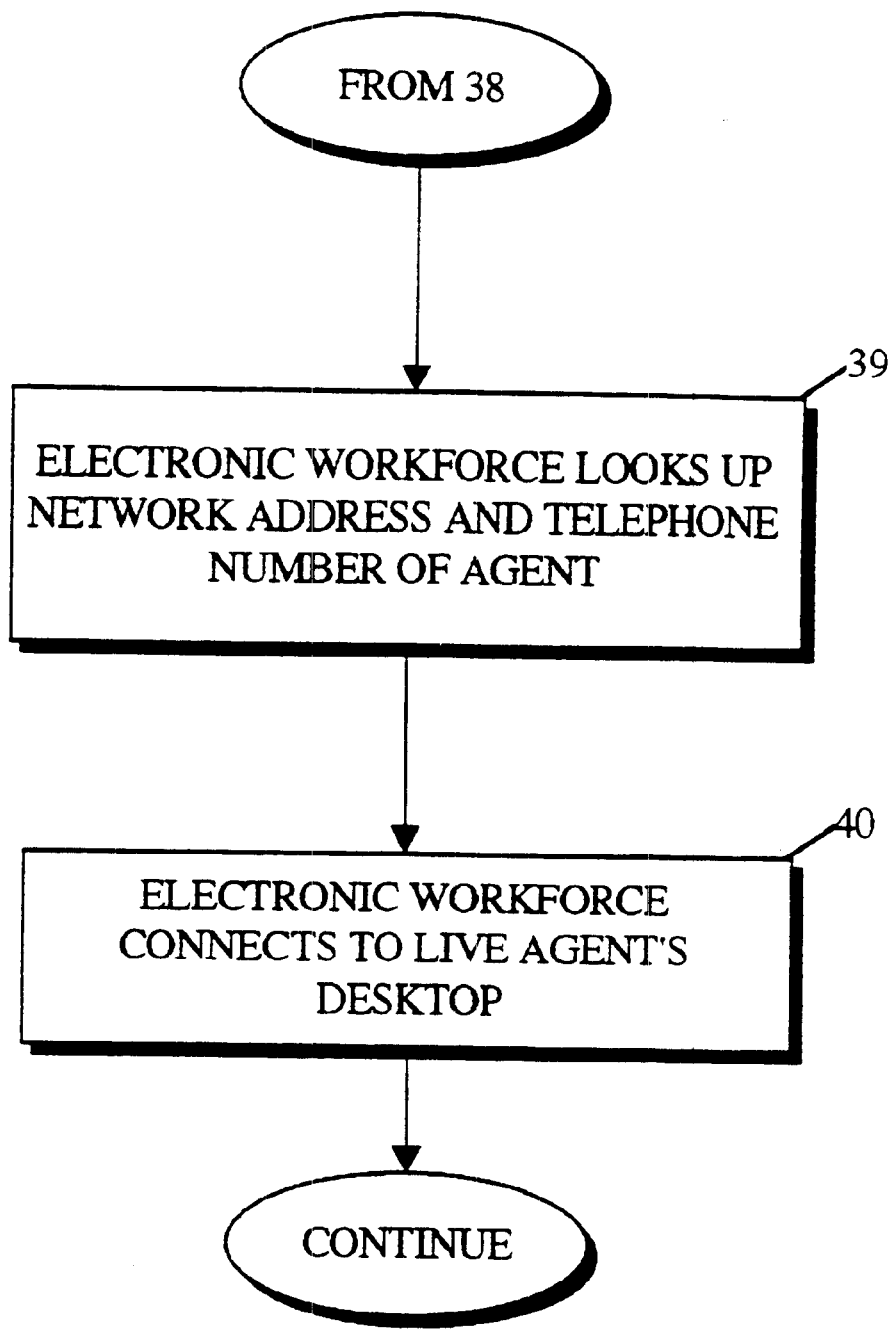

As shown in FIG. 3d, electronic workforce 5 then looks up 39 the network address of the live agent at a memory location in electronic workforce 5, including a look-up table for example which relates specific live agent ID#'s with the network addresses of the corresponding live agents. Next, the electronic workforce 5 connects to a live agent's desktop.

Figure 3E:
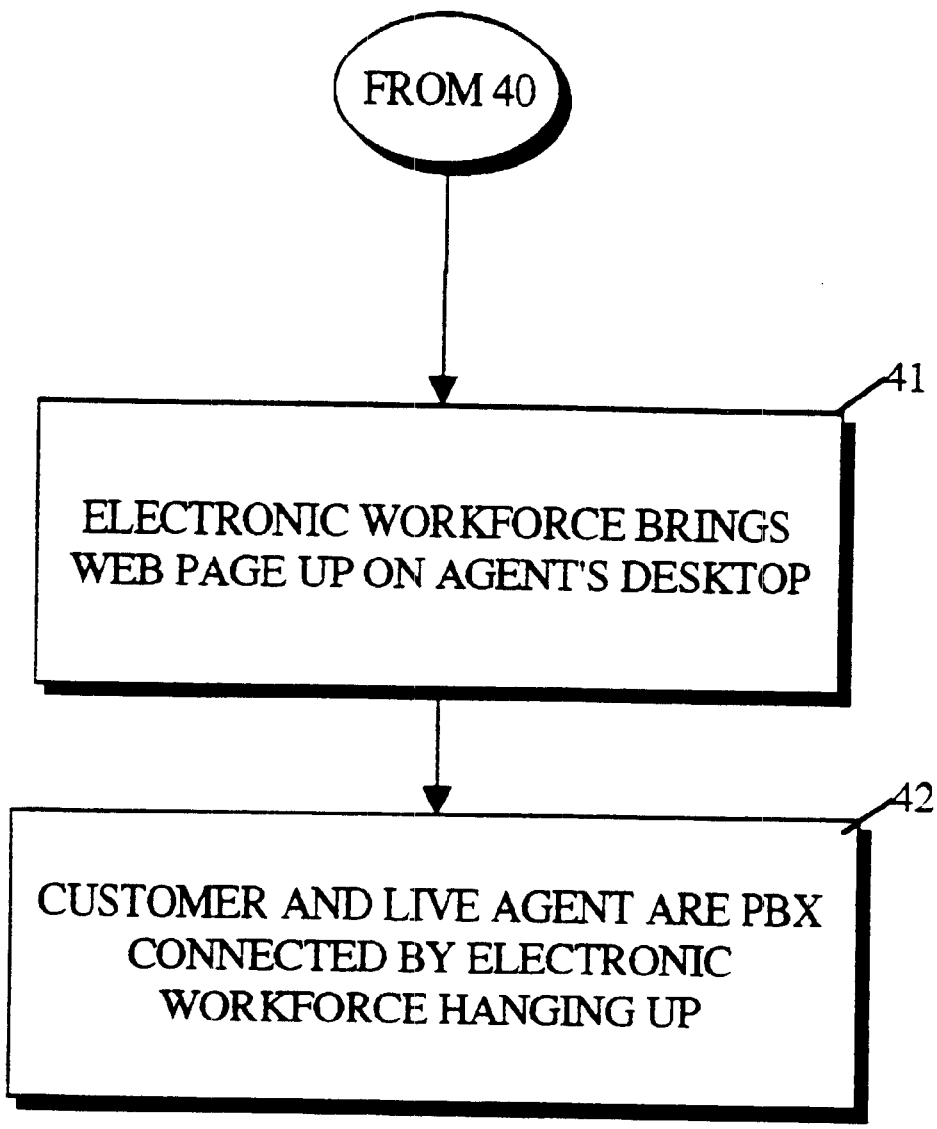

Then, as shown in FIG. 3e, the electronic workforce brings the customer's web page up on the agents's desktop. At this time, customer and live agent are PBX connected 42.

What is claimed is:

1. In a computer system, a method for routing information to a live agent that is also routed via the Internet to a live Internet user, the method comprising:
   receiving a request for information at a server from an Internet browser on a first computer associated with the live Internet user;
   sending the requested information to the Internet browser on the first computer;
   receiving a request at the server from the live Internet user, via the Internet browser on the first computer, that a live agent be connected to the live Internet user's phone number;
   calling by the server a telephone number associated with the live agent;
   sending the information sent to the Internet browser on the first computer to an Internet browser on a second computer associated with the live agent;
   establishing a telephone connection between the live Internet user and the live agent; and
   if, during the telephone connection between the live agent and the Internet user, additional information is sent to the browser on the first computer for display to the Internet user, sending the browser on the second computer the additional information for display to the live agent.

2. The method of claim 1 further comprising receiving identification information from the live agent.

3. The method of claim 1, wherein the step of sending additional information includes:
   simulating a request for an update at the second computer;
   receiving a request for an update from the Internet browser at the second computer;
   sending the additional information to the Internet browser on the second computer.

4. The method of claim 1 further comprising mapping the live agent to a phone number.

5. The method of claim 1 wherein the information requested is business application information.

6. In a computer system, a method for retrieving information associated with a live Internet user and routing the information to a live agent, the method comprising:
   receiving via the internet a request for information from an Internet browser on a first computer associated with a live Internet user;
   obtaining the information requested by the Internet browser on the first computer;
   transmitting, via the Internet, the obtained information to the Internet browser on the first computer for display on the first computer;
   offering the live Internet user a choice of speaking with a live agent;
   receiving a request for the live agent;
   mapping the live agent to a phone number;
   identifying a second computer associated with the live agent;
   routing the information transmitted to the Internet browser on the first computer to an Internet browser on the second computer;
   establishing phone communication between the live agent and the Internet user; and
   if, during the telephone connection between the live agent and the Internet user, additional information is sent to the browser on the first computer for display to the Internet user, sending the browser on the second computer the additional information for display to the live agent.

7. A communication system, comprising:
   a first computer for use by a live Internet user;
   a second computer for use by a live agent;
   a database;
   a server coupled to the database and to the first computer and the second computer, via an Internet connection wherein the server is configured to:
      receive a request at the server from an Internet browser on the first computer associated with the live Internet user for information from the database;
      send the information to the Internet browser on the first computer;
      receive a request at the server from the live Internet user, via the Internet browser on the first computer, that the live agent be connected to the live Internet user's phone number;
      call by the server a telephone number associated a second computer used by the live agent;
      send the information sent to the Internet browser on the first computer to an Internet browser on a second computer associated with the live agent;
      establish a telephone connection to the phone number of the live Internet user; and
      if, during the telephone connection between the live agent and the Internet user, additional information is sent to the browser on the first computer for display to the Internet user, send the browser on the second computer the additional information for display to the live agent.

8. The method of claim 7, wherein the step of sending additional information includes:

simulating a request for an update at the second computer;

receiving a request for an update from the Internet browser at the second computer;

sending the additional information to the Internet browser on the second computer.

9. A computer program embodied in a tangible medium and capable of being read by a computer for performing a method for routing information to a live agent that is also routed via the Internet to a live Internet user, the method comprising:

receiving a request for information from an Internet browser on a first computer associated with the live Internet user for information;

sending the requested information to the Internet browser on the first computer;

receiving a request from the live Internet user, via the Internet browser on the first computer, to be connected to a live agent;

calling a telephone number associated the live agent;

sending information sent to the Internet browser on the first computer to an Internet browser on a second computer associated with the live agent;

establishing a telephone connections between the live internet user and the liver agent; and if, during the telephone connection between the live agent and the Internet user additional information is sent to the browser on the first computer for display to the Internet user, sending the browser on the second computer the additional information for display to the agent.

10. The computer program of claim 9, wherein the step of sending additional information includes:

simulating a request for an update at the second computer;

receiving a request for an update from the Internet browser at the second computer;

sending the additional information to the Internet browser on the second computer.

* * * * *

UNITED STATES PATENT AND TRADEMARK OFFICE
CERTIFICATE OF CORRECTION

PATENT NO.     : 6,463,149 B1                                       Page 1 of 1
DATED          : October 8, 2002
INVENTOR(S)    : Charles H. Jolissaint and Xuan McRae It is certified that error appears in the above-identified patent and that said Letters Patent is hereby corrected as shown below:

<u>Title page,</u>
Item [56], FOREIGN PATENT DOCUMENTS, add the following two references:
-- 2286699A   08/23/95   Great Britain   G06F   3/14
   2286999B   09/16/98   Great Britain   G06F   3/00, 3/14
                                                3/153, 9/46 --

U.S. PATENT DOCUMENTS, add the following reference:
-- 5,530,795   06/25/96   Wan   395   135   02/15/94 --

<u>Column 10,</u>
Line 5, change "connections" to -- connection --.
Line 6, change "liver" to -- live --.

Signed and Sealed this

Twenty-eighth Day of October, 2003

JAMES E. ROGAN
*Director of the United States Patent and Trademark Office*